Patented Feb. 28, 1950

2,499,265

UNITED STATES PATENT OFFICE 2,499,265

4-METHYLENEAMINO-PYRAZOLONE DERIVATIVE

Maurice Ernest Bouvier, St.-Didier au Mont d'Or, France, assignor to Societe des Usines Chimiques Rhone-Poulenc, Paris, France, a French company No Drawing. Application May 15, 1946, Serial No. 670,042. In France January 18, 1944

Section 1, Public Law 690, August 8, 1946
Patent expires January 18, 1964

5 Claims. (Cl. 260—310)

This invention is for improvements in or relating to the production of pyrazolone derivatives and, in particular, concerns the preparation of 1-phenyl-2:3-dimethyl-4 - dimethylaminopyrazolone, also known under the name "pyramidone," from a new intermediate, the corresponding 4-methyleneamino compound. This invention also includes the said intermediate and processes for the preparation of the same.

The preparation of pyramidone (1-phenyl-2:3-dimethyl - 4 - dimethylaminopyrazolone or dimethylamino antipyrine) has heretofore usually been effected by the dimethylation of aminoantipyrine, employed either in the pure state or without isolation from the medium in which it is formed. If it was necessary to isolate the aminoantipyrine, which is very soluble in water, the process has become complicated. If the aminoantipyrine was dimethylated directly in the solution in which it was prepared, then most of the impurities which accompanied it were retained by the pyramidone in addition to those which were formed during the methylation; moreover, the aminoantipyrine solution was often so dilute that dimethylation was difficult.

As a result of research and experimentation, it has now been found that it is possible to separate the aminoantipyrine in an insoluble form from the medium in which it has been prepared by combining it with an equimolecular amount of formaldehyde. The compound thus formed, which has not hitherto been described, has the great advantage that it can readily be transformed into pyramidone by concomitant or successive reduction and methylation.

The formaldehyde combines with aminoantipyrine with elimination of one molecule of water according to the equation:

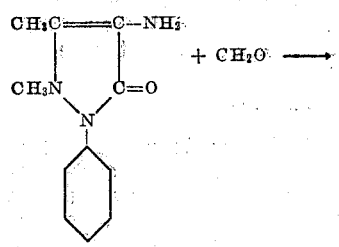
$+ CH_2O \longrightarrow$

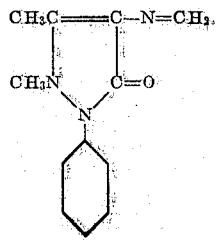
$+ H_2O$

For convenience, the product is described hereinafter as methylene-aminoantipyrine.

When an aqueous solution of aminoantipyrine is treated with a molecular proportion of formaldehyde (in the form of the ordinary aqueous solution) the mixture, which is at first clear, becomes more and more turbid and a thick, viscous, sticky oil separates. This oil is slightly soluble in water and in alkali, but is soluble in dilute acids, alcohols or other solvents. This oil, which is probably methyleneaminoantipyrine in its monomeric form, polymerises more or less rapidly to a solid product soluble in acids but insoluble in water and sparingly soluble in the majority of organic solvents in the cold. It melts at approximately 169–172° C.

The methyleneaminoantipyrine can therefore be separated either in the form of an oil or in the form of a solid. It is difficult to effect separation in the form of an oil because the latter is sticky and viscous. However, for separation, use can be made of the substance's property of being stable in the presence of alkalies and of dissolving readily in benzene and other organic solvents. The methylene aminoantipyrine is more soluble in benzene than is, for example, aminoantipyrine but since it is less soluble in water, it can readily be separated in the form of a solution in benzene. If the benzene solution is evaporated rapidly in vacuo the methyleneaminoantipyrine is obtained in the form of the oil. On the other hand, if the solution is boiled for some time, then there is precipitated a solid product (polymer) melting at 169–172° C. On keeping it in the cold for some time it again deposits in a solid form.

It has been found that this polymerisation is considerably accelerated when the monomer is stirred in the presence of water and benzene (or some other solvent of the monomer which is also immiscible with water). Hence, if an aqueous solution of formaldehyde is run into an aqueous solution of aminoantipyrine and stirred with benzene (or with toluene, etc.), it soon forms a cream which becomes completely homogenous. On removal of the benzene or its equivalent, either by distillation or by evaporation in a current of gas, there is formed an aqueous suspension of polymerised methyleneaminoantipyrine, which can be filtered.

The monomeric methyleneaminoantipyrine, which is slightly soluble in water, is soluble in alcohols (methyl, ethyl, etc.) and equally soluble in presence of a molecule of aqueous formaldehyde solution. The methyleneaminoantipyrine of M. P. 169–172° C., is insoluble in water, very slightly soluble in most organic solvents in the cold, especially in alcohols, but in the presence of a molecular proportion of formaldehyde it becomes soluble, especially at high temperatures, and it is then not reprecipitated on cooling.

Methyleneaminoantipyrine, polymerised or not, can readily be reduced by known methods of hydrogenation to mono - methylaminoantipyrine when it is treated, for example, either with an acid and a reducing metal (such as zinc and hydrochloric acid), or with formic acid under heat, or with hydrogen in the presence of a metal hydrogenation catalyst (nickel, platinum or palladium).

Mono-methylaminoantipyrine can in its turn be methylated to dimethylaminoantipyrine (pyramidone) either by means of a methyl halide or of dimethyl sulphate or, again, of formaldehyde in presence of a reducing agent (zinc and hydrochloric acid, formic acid, or hydrogen and a catalyst).

Methyleneaminoantipyrine, polymerised or not, can be converted directly into dimethylaminoantipyrine (pyramidone), without isolating the monomethyl derivative, by treatment with a molecular proportion of formaldehyde in the presence of a reducing agent (metal plus an acid, or formic acid or hydrogen in the presence of a catalyst such, for example, as platinum, palladium or nickel).

The present invention is illustrated by the following, non-limitative examples in which the parts stated are parts by weight. Of these examples, I to VIII illustrate the preparation of the methylene aminoantipyrine, while the remainder illustrate the preparation of pyramidone from the methyleneaminoantipyrine.

Example I 203 parts of aminoantipyrine are dissolved in water: 100 parts of a 30% by volume solution of formaldehyde are added to the solution thus formed, either with or without stirring: there is soon precipitated an insoluble, more or less thick and viscous oil, the required methyleneaminoantipyrine.

Example II

Following the procedure of Example I, except that the water in which the aminoantipyrine is dissolved is made alkaline with a solution of an alkali such, for example, as sodium carbonate or caustic soda or caustic potash. When all the formaldehyde has been added, benzene is added (100 parts or more); the oil formed is thereby taken up into the benzene and the benzene solution is then decanted off. Rapid evaporation of this solution gives the methyleneaminoantipyrine, which can then be isolated in the form of a salt (hydrochloride, sulphate, etc.).

Example III

Following the procedure of Example II, without, however, adding the alkali, but after the addition of the formaldehyde (or before) adding 600 parts of benzene, the whole is stirred rapidly. A more or less thick cream is formed, the benzene is driven off (for example, by distillation under reduced pressure) and the methyleneaminoantipyrine separates in the form of a powder in aqueous suspension, which is readily filtrable. If the procedure is carried out using a lesser quantity of benzene (100 parts for example), a filtrable granular powder is obtained directly. It retains benzene which can be removed by known methods either before or after the filtration.

Example IV

An aqueous solution containing 203 parts of aminoantipyrine is added to 200 parts of benzene, the whole being thoroughly shaken; the temperature is raised to 60° C. and over a few minutes 100–110 parts of 30% formaldehyde are added. The temperature is then raised to boiling point (71–72° C.); the methyleneaminoantipyrine polymer forms very rapidly. The benzene is driven off by gradually raising the temperature to 80° C.; the methyleneaminoantipyrine separates in the form of a powder which is easy to filter.

Example V

In this example, the procedure of Example IV is followed, except that the benzene and the formaldehyde are added in the cold during rapid stirring; the methylaminoantipyrine polymerises and in presence of the benzene forms a voluminous spongy mass. The polymerisation is allowed to go to completion for some time (one hour, for example); the benzene is evaporated by raising the temperature. The methyleneaminoantipyrine settles as a powder or in fine friable granules which are readily filtrable.

In all the foregoing examples the aminoantipyrine can be replaced by an aminoantipyrine solution such as is obtained in the processes for its preparation. If, using such a solution, it is desired to work according to Examples I, III, IV and V, the liquid would have to be exactly neutralised; according to Example II, it would be necessary to lixiviate with more than 1 molecule of an alkali. Examples VI, VII and VIII illustrate such modes of procedure.

Example VI 950 parts of the solution from the hydrolysis of "sulphaminoantipyrine" containing 97 g. of hydrochloric acid and 77 g. of aminoantipyrine per litre are added to 400 parts of water; acidity is neutralised with commercial sodium carbonate until the pH is 6.8 (117 parts of soda); 300 parts of benzene are then added and at 30° C., over a period of 20 minutes, 30–33 parts of a 30% by weight commercial solution of formaldehyde are gradually added with stirring. A cream soon forms and gradually becomes thicker. Stirring is continued for some hours in order to complete the reaction. Benzene is then distilled off, under partial vacuum if desired, the temperature being gradually raised to a point not exceeding 80° C. The cream is gradually converted to an almost colourless powder which is filtered and washed with water. 63.5 parts of methyleneaminoantipyrine of M. P. 169–172° C. are thereby obtained, being substantially the theoretical amount (64.1 parts).

Example VII

Working with a solution as described in Example VI, but after neutralisation with carbonate and addition of benzene, 12 parts of caustic soda or 40 parts of 30% sodium carbonate or a corresponding amount of any other alkali are added, and the formaldehyde is then run in. In this case, a cream is not formed; on standing, the reaction mixtures separates into two distinct layers. The upper, benzene layer contains the monomeric methyleneaminoantipyrine which can be recovered by evaporation of the benzene or can be polymerised by boiling the benzene solution or by stirring it with water, in which case it forms a cream which would be worked up as in the preceding examples. It can also be precipitated from benzene by treatment with an acid which forms a water-soluble salt.

*Example VIII*

Proceeding as in Example VI, but with the addition of only 60 parts of benzene instead of 300 parts and pouring in the formaldehyde with simultaneous rapid stirring, the product is formed, not as a cream, but separates as a semi-solid mass. This mass breaks up into spongy granules which harden more and more as polymerisation of the methyleneaminoantipyrine proceeds. The major portion of the benzene is distilled off by raising the temperature of the mixture to 80° C.; the methyleneaminoantipyrine settles as a powder when it is easy to filter and easy to free, by washing, from entrained salts.

In all of Examples VI to VIII, the quantity of monomeric or polymeric methyleneaminoantipyrine which is recovered corresponds approximately to the theoretical amount calculated on the amount of aminoantipyrine contained in the original solution.

The following examples illustrate the conversion of mono- or polymeric methyleneaminoantipyrine into pyramidone by two different methods viz: firstly, hydrogenation to monomethylaminoantipyrine, which in turn is methylated by known method, and secondly by direct conversion to dimethylaminoantipyrine.

*Example IX*

Into a hydrogenation apparatus is charged a solution containing 215 parts of methyleneaminoantipyrine, either polymerised or not, 500 parts of ordinary alcohol, and 100 parts of a 30% (by weight) formaldehyde solution. On warming to 50° C. a clear solution is obtained, which does not deposit a precipitate on cooling. Active nickel is added, air in the apparatus is replaced by hydrogen and stirring is begun; hydrogen absorption is rapid and takes place in the cold and at atmospheric pressure. Hydrogenation can be effected at elevated temperature and under pressure if desired. At atmospheric pressure and a temperature of 20-30° C. with rapid stirring, theoretical absorption of hydrogen is achieved, the time required varying from 30 minutes to 2 hours, according to the method of stirring and the amount of nickel used. The catalyst is then separated from the alcoholic solution of pyramidone. The solution is concentrated and allowed to crystallise. 225-230 parts of pyramidone are recovered therefrom, melting at 106-107° C.; the yield is quantitative.

*Example X*

215 parts of methyleneaminoantipyrine are dissolved in a mixture of ice and hydrochloric acid (300 parts of ice to approximately 800 parts of 30% hydrochloric acid) 100 parts of 30% formaldehyde are added. The mixture is stirred and 200 parts of zinc dust 75% (or the corresponding amount if the titre is different) are added gradually, the temperature being maintained just below 25° C. The mixture is then raised to 70° C. to complete the solution of the zinc, after which the mixture is neutralised and the pyramidone is extracted by known methods. The yield is excellent, approximating to the theoretical.

The experimental conditions hereinbefore described can be varied between wide limits. There can be employed, for example, a different reducing metal in place of zinc (for example aluminium) and an acid other than hydrochloric, for example sulphuric acid.

*Example XI*

In order to effect the reduction when the reducing agent is formic acid in accordance with the following equation;

$$RN=CH_2+CH_2O+2HCOOH \rightarrow RN(CH_3)_2+2CO_2+H_2O$$

the operation must be carried out in the cold. If the temperature is allowed to rise, the reaction proceeds too rapidly. In the foregoing equation R represents the pyrazolone residue.

215 parts of methyleneaminoantipyrine are dissolved in 200 parts of water containing 46 parts of formic acid. This solution is poured gradually into 110 parts of 30% formaldehyde, 50 parts of water, and 50 parts of formic acid, the temperature being maintained at 85-95° C. The amount of carbon dioxide which is evolved affords means of following the progress of the reaction. When the reaction is completed, the whole is made alkaline and the pyramidone, which is formed in very good yield, is extracted by known methods.

I claim:

1. A process for the preparation of 1-phenyl-2:3-dimethyl-4-methyleneamino-pyrazolone which comprises mixing an aqueous solution of 1-phenyl-2:3-dimethyl-4-aminopyrazolone with formaldehyde and separating 1-phenyl-2:3-dimethyl-4-methyleneaminopyrazolone from the reaction mixture.

2. A process for the preparation of 1-phenyl-2:3-dimethyl-4-methyleneamino-pyrazolone wherein an aqueous medium containing 1-phenyl-2:3-dimethyl-4-aminopyrazolone is mixed with one molecular equivalent of formaldehyde, the reaction mixture is mixed with a water-immiscible solvent and agitated and 1-phenyl-2:3-dimethyl-4-methyleneaminopyrazolone separated in the form of a solid polymer.

3. Process as claimed in claim 2, wherein the water-immiscible solvent is benzene.

4. The polymeric form of 1-phenyl-3-methyl-4-methyleneamino-pyrazolone which melts at approximately 169-172° C. and which is soluble in acids but insoluble in water and is sparingly soluble in most organic solvents in the cold.

5. Compounds having the formula

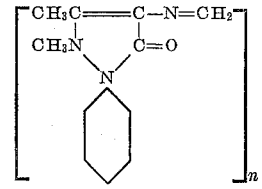

where $n$ is a positive integer.

MAURICE ERNEST BOUVIER.

REFERENCES CITED

The following references are of record in the file of this patent:

UNITED STATES PATENTS

| Number | Name | Date |
|---|---|---|
| 1,531,286 | Hoffmann | Mar. 31, 1925 |
| 2,045,588 | Dvornikoff | June 30, 1936 |

OTHER REFERENCES

Annalen, vol. 293, page 62 (1896).

Chemical Abstracts, vol. 38, pp. 1233-1234, citing Skita et al., Berichte, 75B, pp. 1696-1702 (1942).